US006698540B1

(12) United States Patent
Decker, Jr.

(10) Patent No.: US 6,698,540 B1
(45) Date of Patent: Mar. 2, 2004

(54) MOTORIZED SNOWBOARD

(76) Inventor: James E. Decker, Jr., 516 Locust St., Apt. E, Middletown, IN (US) 47356

(*) Notice: Subject to any disclaimer, the term of this patent is extended or adjusted under 35 U.S.C. 154(b) by 161 days.

(21) Appl. No.: 10/074,890

(22) Filed: Oct. 26, 2001

(51) Int. Cl.[7] .............................................. A63C 17/12
(52) U.S. Cl. ........................ 180/181; 180/11; 180/190
(58) Field of Search ................................ 180/180, 181, 180/190, 11, 6.7; 280/481, 484

(56) References Cited

U.S. PATENT DOCUMENTS

| | | | |
|---|---|---|---|
| 2,450,566 A | * 10/1948 | Schmid | 180/196 |
| 2,528,890 A | 11/1950 | Lawrence | |
| 2,552,846 A | * 5/1951 | Dinkins | 180/11 |
| 2,706,528 A | * 4/1955 | Kallio | 180/190 |
| 2,727,581 A | 12/1955 | Wright | |
| 2,741,487 A | 4/1956 | Carefoot | |
| 2,855,059 A | 10/1958 | Sutherland | |
| 2,919,142 A | * 12/1959 | Winget | 280/481 |
| 3,338,589 A | 8/1967 | Barton et al. | |
| 3,419,095 A | 12/1968 | Hood | |
| 3,568,787 A | 3/1971 | Gremeret | |
| 3,645,348 A | 2/1972 | Thompson | |
| 3,712,396 A | 1/1973 | Ende | |
| 3,750,776 A | * 8/1973 | Stevenson | 180/196 |
| 3,791,469 A | * 2/1974 | Prosser et al. | 180/180 |
| 3,826,323 A | 7/1974 | Mehne | |
| 3,964,560 A | * 6/1976 | Husted | 180/181 |
| 3,966,010 A | * 6/1976 | Shiber | 180/181 |
| 4,109,739 A | * 8/1978 | Husted | 180/186 |
| 4,307,788 A | 12/1981 | Shelton | |
| 4,461,365 A | * 7/1984 | Diggs | 180/11 |
| 4,519,470 A | 5/1985 | Allisio | |
| 4,633,964 A | 1/1987 | Boyer et al. | |
| 5,127,488 A | 7/1992 | Shanahan | |
| 5,305,846 A | 4/1994 | Martin | |
| 5,435,408 A | 7/1995 | Sekinobu | |
| 5,518,080 A | * 5/1996 | Pertile | 180/190 |
| 5,662,186 A | 9/1997 | Welch | |
| 5,975,229 A | 11/1999 | Hosoda | |
| 5,984,032 A | 11/1999 | Gremillion et al. | |
| 6,074,271 A | 6/2000 | Derrah | |
| 6,095,547 A | 8/2000 | Vandergrift et al. | |
| 6,162,115 A | 12/2000 | Schudrich | |
| 6,193,003 B1 | 2/2001 | Dempster | |
| 6,227,555 B1 | 5/2001 | Wang et al. | |
| 2001/0001770 A1 | 5/2001 | Spangler et al. | |
| 2001/0006283 A1 | 7/2001 | Higgins et al. | |
| 2002/0008361 A1 | 1/2002 | Smith | |

FOREIGN PATENT DOCUMENTS

CA 631338 11/1961

OTHER PUBLICATIONS

Fast Trax ®, Motorized Stand up Snow Mobile, www.fasttrax.com, 5 pages.
Pro Power Ski, Power Toys, www.fastscooters.com/powbord.htm, 2 pages.
HyperTek Snow Toys, www.sfgate.com/hypertek/9710/3_snowtoys.shtml, 2 pages.
2 pages from website: www.svmotorsports.com/sv_snow_99kittycat.htm showing features of KittyCat® snowmobile.

(List continued on next page.)

Primary Examiner—Daniel G. DePumpo
(74) Attorney, Agent, or Firm—Woodard, Emhardt, Moriarty McNett & Henry LLP

(57) ABSTRACT

An apparatus for propelling a user over snow. The invention in one embodiment couples a propulsion unit behind a platform such as a snowboard. The propulsion section and snowboard are interconnected by a joint providing multiple degrees of rotational freedom. Preferably, the interconnection further includes one or more springs.

30 Claims, 4 Drawing Sheets

OTHER PUBLICATIONS 2 pages from website: www.snowconnection.com/Resources/Manufactures/ArticCat2k/youth.htm containing description of Arctic Cat and Z 120 youth snowmobiles.

4 pages from website: www.powerplank.com/index.html showing various information and photographs of the motorized snowboard, Power Plank.

11 pages from website: www.powerboarding.com/powered-surfboards.htm showing photographs and various information in regards to powered surfboards.

6 pages from website: www.powerboarding.com/powered-skateboards.thm showing photographs and various information in regards to powered skateboards.

6 pages from website: www.powerboarding.com/powerdsnowboards.htm showing photographs and various information in regards to powered snowboards.

* cited by examiner

MOTORIZED SNOWBOARD

FIELD OF THE INVENTION

The present invention relates to powered devices driven over snow, and in particular, a powered snowboard.

BACKGROUND OF THE INVENTION

There are numerous designs for powered devices or "toys" for recreational activity on snow. For example, there are snowmobiles, which are a type of off-road vehicle designed and optimized for travel over snow. There are some designs that attempt to provide motorized power to a person on a pair of snow skis. There are also designs for providing power to a snow sled.

In any powered recreational device, it is important that the device include features for control of the direction of the device. A nimble, easy to control recreational device will be both more fun and safer for the user of the device.

The capabilities and/or complexity of the control features are problems on many recreational snow devices. For example, some devices are linked to a motorized propulsion unit such that there is little or no flexibility or pivoting ability of the propulsion unit relative to the user platform. Yet other designs offer multiple degrees of freedom between the user platform and the propulsion device, but provides this in a relatively large, complex mechanism. Yet other designs allow for pivotal movement of the user platform relative to the propulsion device, but do not provide any mechanism for restoring alignment of the two devices. What are needed are apparatus and methods which overcome these failings. The present design does this in a novel and unobvious way.

SUMMARY OF THE INVENTION

According to one embodiment of the present invention, there is an apparatus comprising a user platform and adapted and configured for accepting a standing operator. The apparatus also includes a propulsion unit having an engine driving tracks adapted and configured for propelling the propulsion unit and the user platform over snow. The apparatus also includes a ball joint interconnecting the front of the propulsion unit to the rear of the user platform. The apparatus also includes a spring interconnecting the propulsion unit to the user platform.

According to another embodiment of the present invention, there is an apparatus comprising a user platform. The apparatus also includes a propulsion unit having an engine driving tracks adapted and configured for propelling the propulsion unit and the user platform over snow. The apparatus also includes a first spring interconnecting the propulsion unit to the user platform and adapted and configured to apply a biasing force along a first axis, and a second spring interconnecting the propulsion unit to the user platform and adapted and configured to apply a biasing force along a second axis, with the first axis being horizontally displaced from the second axis.

According to another embodiment of the present invention, there is a method for propelling a platform over snow, comprising providing a front platform and a track-driven propulsion unit including an engine. The method also includes interconnecting the propulsion unit behind the front platform so that the front platform can rotate relative to the propulsion unit with at least two degrees of freedom. The method also includes steering the front platform to cause rotation of the platform relative to the propulsion unit. The method also includes biasing the propulsion unit relative to the front platform in a direction to return the propulsion unit to a location behind the front platform.

According to another embodiment of the present invention, there is an apparatus comprising a user platform having a front and a rear and adapted and configured for accepting an operator. The apparatus also includes a propulsion unit having an engine adapted and configured for propelling the propulsion unit and the user platform over snow. The apparatus also includes a pivoted joint interconnecting the front of the propulsion unit to the rear of the user platform, the joint permitting the user platform to rotate about the propulsion unit with multiple degrees of freedom. The apparatus also includes a dampener interconnecting the propulsion unit to the user platform.

These and other objects and advantages of the present invention can be found in the description, drawings and claims to follow.

DESCRIPTION OF THE PREFERRED EMBODIMENT

Figure 1:
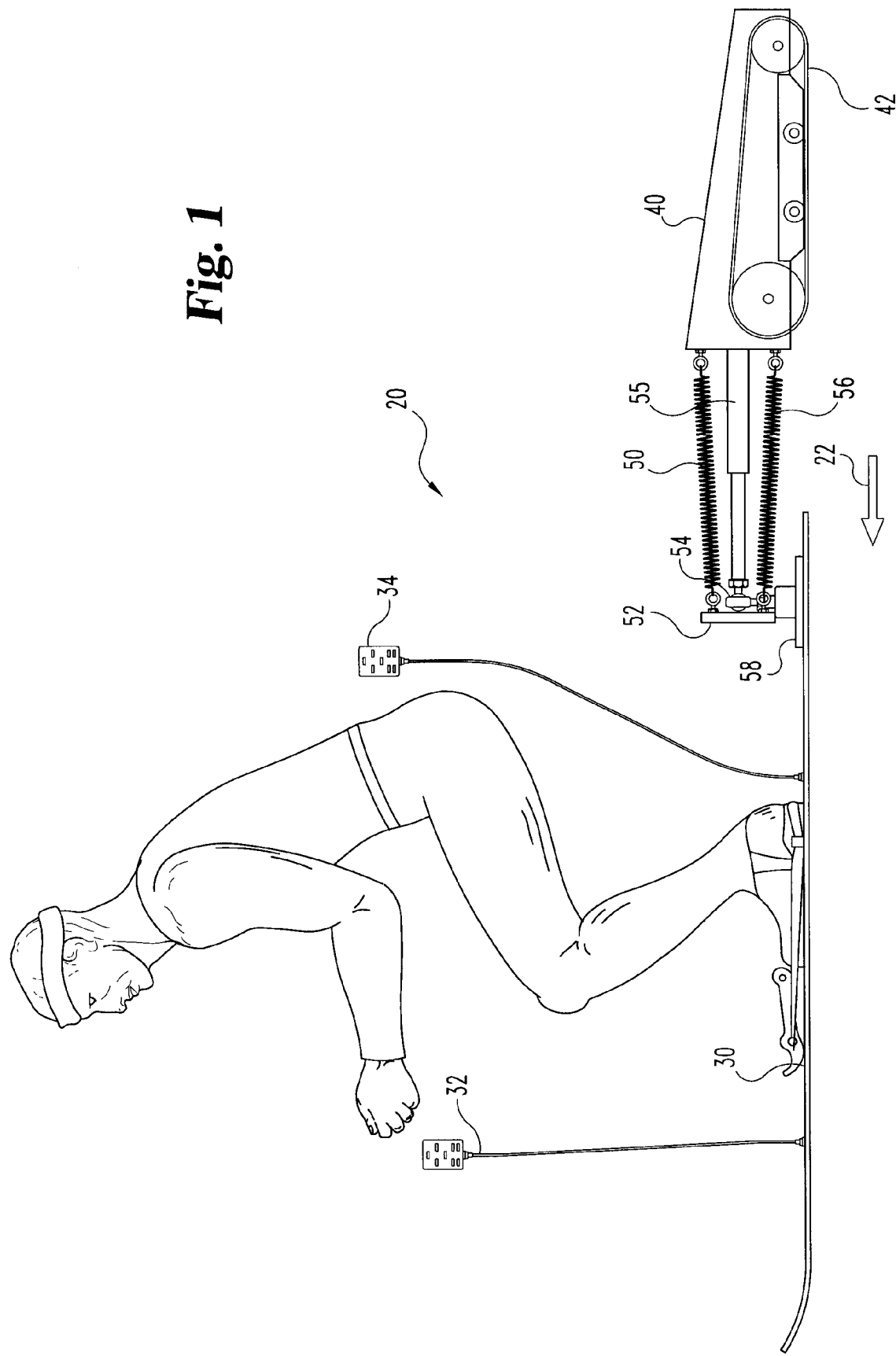
FIG. 1 is a side elevational view of an apparatus according to one embodiment of the present invention, with an operator.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

The present invention pertains to a user platform such as a snowboard which is coupled to a propulsion unit, such that the propulsion unit can pivot or rotate relative to the platform. The platform and propulsion units are preferably coupled by a joint which permits the platform to pivot relative to the propulsion unit with three degrees of rotational freedom (roll, pitch, and yaw). In other embodiments, there is at least one spring which further interconnects the platform and propulsion section. Other embodiments include a plurality of interconnecting springs. The one or more springs are particularly effective in providing a restoring force or restoring torque to the propulsion section, such that the propulsion section realigns itself relative to the user platform after making a pivotal movement. These springs, acting as a biasing unit, assist in preventing jack-knifing of the propulsion unit.

The device is steered similar to the manner in which the platform is steered for those embodiments in which it is not powered by a propulsion unit, but rather is propelled downhill by gravity. For those embodiments in which the user platform is a snowboard, the device is maneuvered when the user twists or turns his or her ankles, or shifts his or her weight, such that the longitudinal axis of the board is no longer aligned with the forward velocity vector, or such that the bottom plane or surface of the snowboard "digs" into the snow along one or more of its edges. Such turning, twisting, and weight shifting changes the orientation of the snowboard relative to the propulsion device. This change in orientation is permitted by an interconnecting joint with multiple degrees of freedom. However, the change in orientation is resisted by one or more springs which interconnect the two platforms. As the springs are compressed or extended, they provide a spring force that tends to restore the propulsion unit to its position aligned behind the snowboard.

Although a snowboard is depicted and described, the present invention contemplates other types of user platforms which are pivotally coupled to a propulsion unit. For example, the present invention further contemplates a snow sled interconnected to a propulsion unit and accommodating a seated user. Other embodiments include interconnection of a skateboard to a propulsion unit.

Further, although the present invention depicts and describes a propulsion unit that is a "pusher" type device, the present invention further contemplates those embodiments in which the propulsion unit is a "puller" or tractor-type device. Further, although the present invention depicts and describes a propulsion unit that includes moving tracks, the present invention further contemplates those embodiments in which the propulsion unit includes wheels, such as when powering a skateboard.

The invention concerns a three-part assembly for a motorized snowboard as best shown in FIG. 1. Assembly 20 includes a user platform or snowboard 30, a rear drive or propulsion section 40, and a center coupling section 50 which mechanically connects sections 30 and 40. Rear drive section 40 is conventional, including a two cycle motor (not shown) which drives a pair of rubber treads 42. Other embodiments of the present invention includes other types of power devices, including four cycle motors and electric motors. Snowboard 30 further includes fore and aft hand grips and/or control panels 32 and 34 which have sufficient rigidity for either providing stability to the user as a handhold or control of the propulsion section.

Snowboard 30 and rear drive section 40 are connected by a center coupling section 50 which permits three dimensional pivoting of a rear drive section 40 relative to snowboard 30. Coupling section 50 includes a vertical attachment plate 52 with a ball and socket joint 54. Ball joint 54 is attached to a rod 55 which extends from the front 41 of drive unit 40.

Coupling section 50 maintains drive unit 40 located behind platform 30 and aligned to a preadjusted orientation relative to platform 30. In a preferred embodiment, platform 30 is oriented directly in front of drive unit 40, such that the centerline of platform 30 and the centerline of drive unit 40 are parallel. However, the present invention also contemplates those embodiments in which the centerlines are not parallel.

In some embodiments of the present invention, rod 55 couples to front 41 of drive unit 40 with a lockable, pivoting coupling (not shown), such that drive unit 40 can be tilted upward, out of contact with the snow, and locked in place in this tilted condition up to and including a vertical position. This locking coupling can include a pair of members each having a mating, knurled face which can be locked together by a wingnut. One member is attached to front 41 of drive unit 40 and the other member is attached to the rear end of rod 55. By loosening the wingnut, the orientation of rod 55 relative to drive unit 40 can be changed. Tightening the wingnut couples the knurled faces together and fixes the orientation of rod 55 relative to drive unit 40. In the tilted configuration, assembly 20 can be ridden down a hill as a conventional snowboard, without the drive unit coming into contact with the snow.

Ball joint 54 permits pivoting of the user platform relative to the propulsion section about any of axes X, Y, or Z. Further, the present invention preferably utilizes a ball joint, such that the X, Y, and Z axes of the three degrees of rotational freedom intersect at a single point within the ball joint. In this preferred embodiment, the pivotal motion of the platform relative to the propulsion section is simplified, and selection of appropriate springs interconnecting the sections is also simplified.

Figure 2:
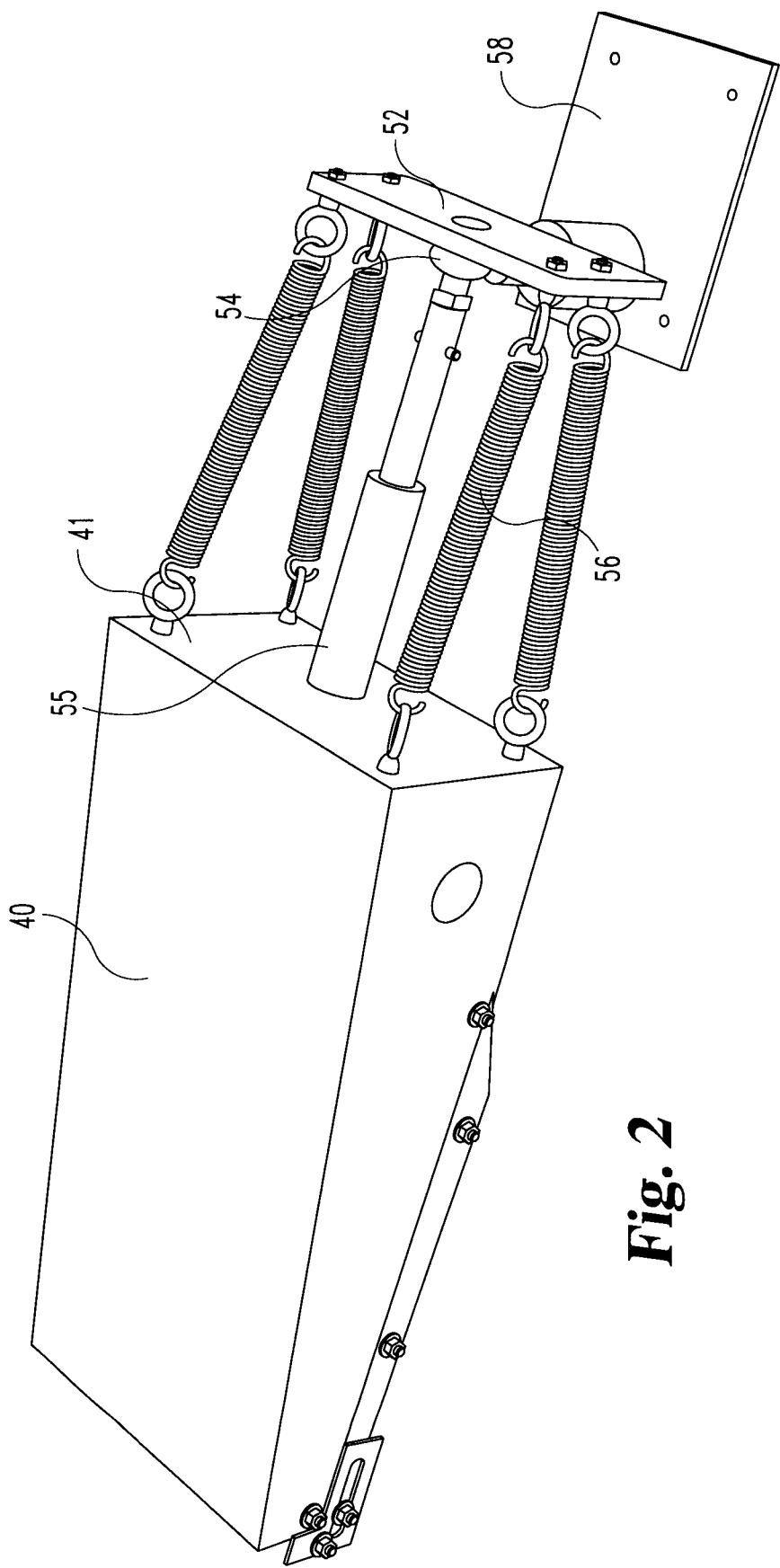
FIG. 2 is a top front perspective view of a portion of the apparatus of FIG. 1.
Figure 3:
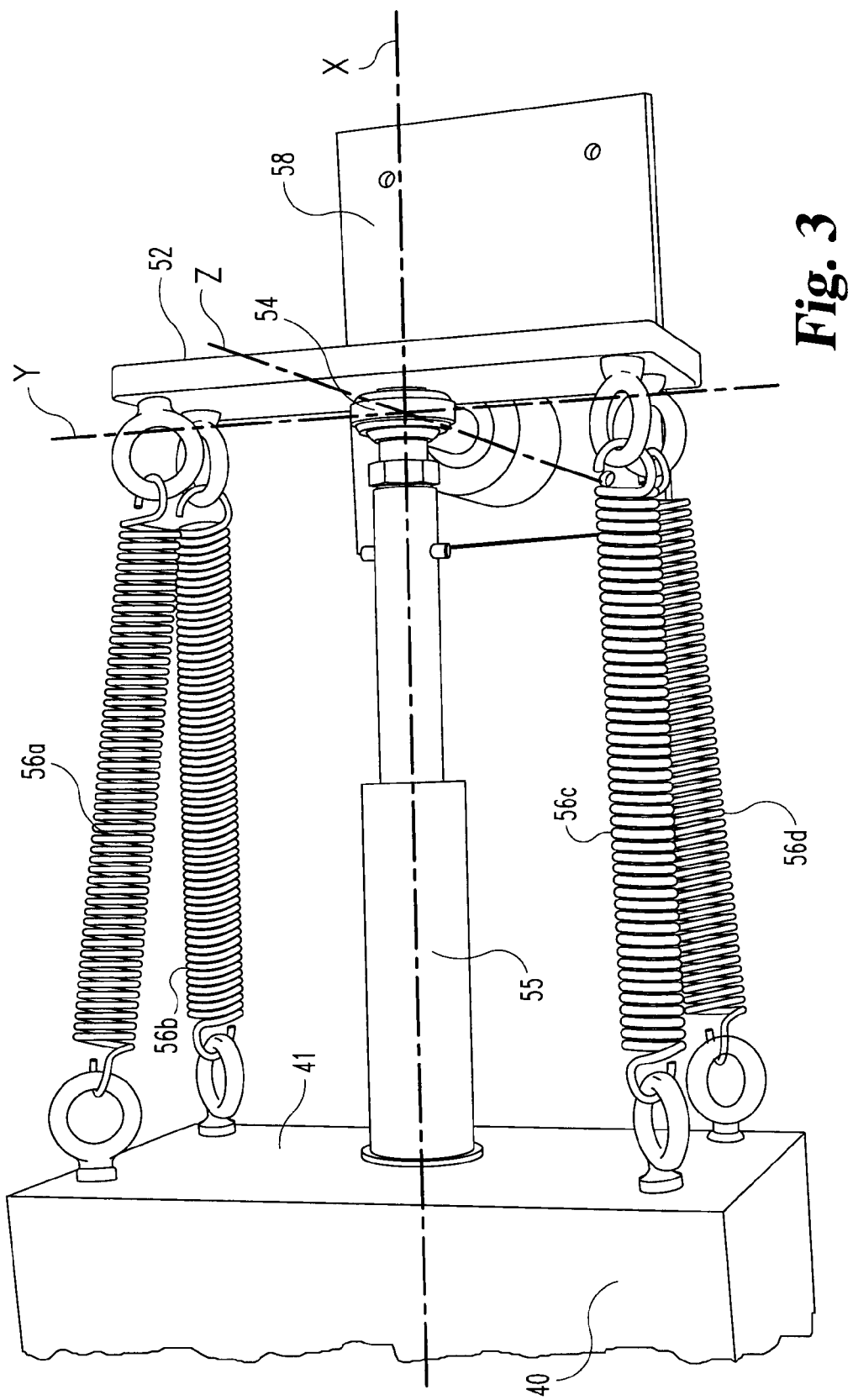
FIG. 3 is a top, enlarged perspective view of a portion of the apparatus of FIG. 2.

Rod 55 is fixed at a particular length by use of a setscrew or similar device. Four springs 56 are coupled by eyebolts (as best seen in FIGS. 2 and 3) to both vertical plate 52 and the front face of drive unit 40. The hooked ends of the springs are able to slide around the eyebolts, thus minimizing bending of the spring. However, the present invention contemplates any manner of interconnecting the springs to the platform or propulsion section. A horizontal attachment plate 58 couples vertical plate 52 to snowboard 30. The present invention further contemplates any manner for attaching the coupling section to the user platform.

Referring to FIGS. 2 and 3, one embodiment of coupling section is shown to include four springs 56 that are interconnected to plate 52 and the front 41 of the propulsion section such that the springs are both vertically and horizontally offset. For example, springs 56a and 56b are attached such that their endpoints are vertically offset (in the Z direction). Further, the working axes along the centerlines of the springs are also offset in the Z direction. Springs 56c and 56d are similarly arranged. Springs 56 bias the propulsion unit relative to the platform to return them to their preadjusted orientation.

Further, top springs 56a and 56c are laterally offset from one another (in the Y direction). Both the ends of the springs and also their centerline working axes are laterally displaced from one another. The similar description applies to bottom springs 56b and 56d. Although coil springs have been shown and described, the present invention also contemplates those embodiments including any type of biasing element, including for example leaf springs, coil springs, and rubber bushings.

FIG. 3 further illustrates yet another preferred characteristic of the alignment of the springs interconnecting the platform and the propulsion section. The centerlines of the springs are angled such that, if carried forward, they would intersect at one or more points in front of the propulsion section. However, although a particular arrangement of four springs has been shown and described, the present invention contemplates the use of either fewer springs or more springs to interconnect the platform and propulsion section. Further, the present invention contemplates those embodiments in which the springs are aligned in substantially parallel fashion, and also aligned such that their centerlines intersect at one or more points behind the user platform.

In use, an operator stands upon snowboard 30 and holds onto hand throttle 34 to control power being delivered to treads 42. The operator also holds on with another hand to handle 32 to stabilize himself. Assembly 20 is propelled in a direction indicated by arrow 22.

The operator is able to steer assembly 20 by twisting or turning his or her ankles, shifting his or her weight, or any other suitable method of steering. Snowboard 30 is able to quickly change its orientation in response to these steering inputs because of the flexibility of center coupling section 50. Snowboard 30 can roll, pitch and yaw relative to rear drive section 40 because of ball joint 54. Further, springs 56 create a tendency for the rear drive unit 40 to realign itself with snowboard 30 after a turn is made. For example, when turning to the left, the springs on the right side of the interconnecting unit (along the outer part of the turn) extend. If the user then decides to adopt a straight path, for instance, these extended springs will pull the propulsion unit back to its original position of alignment behind the snowboard. Without the springs, there may not be any reliable force which works to restore propulsion unit 40 to its original aligned position.

Figure 4:
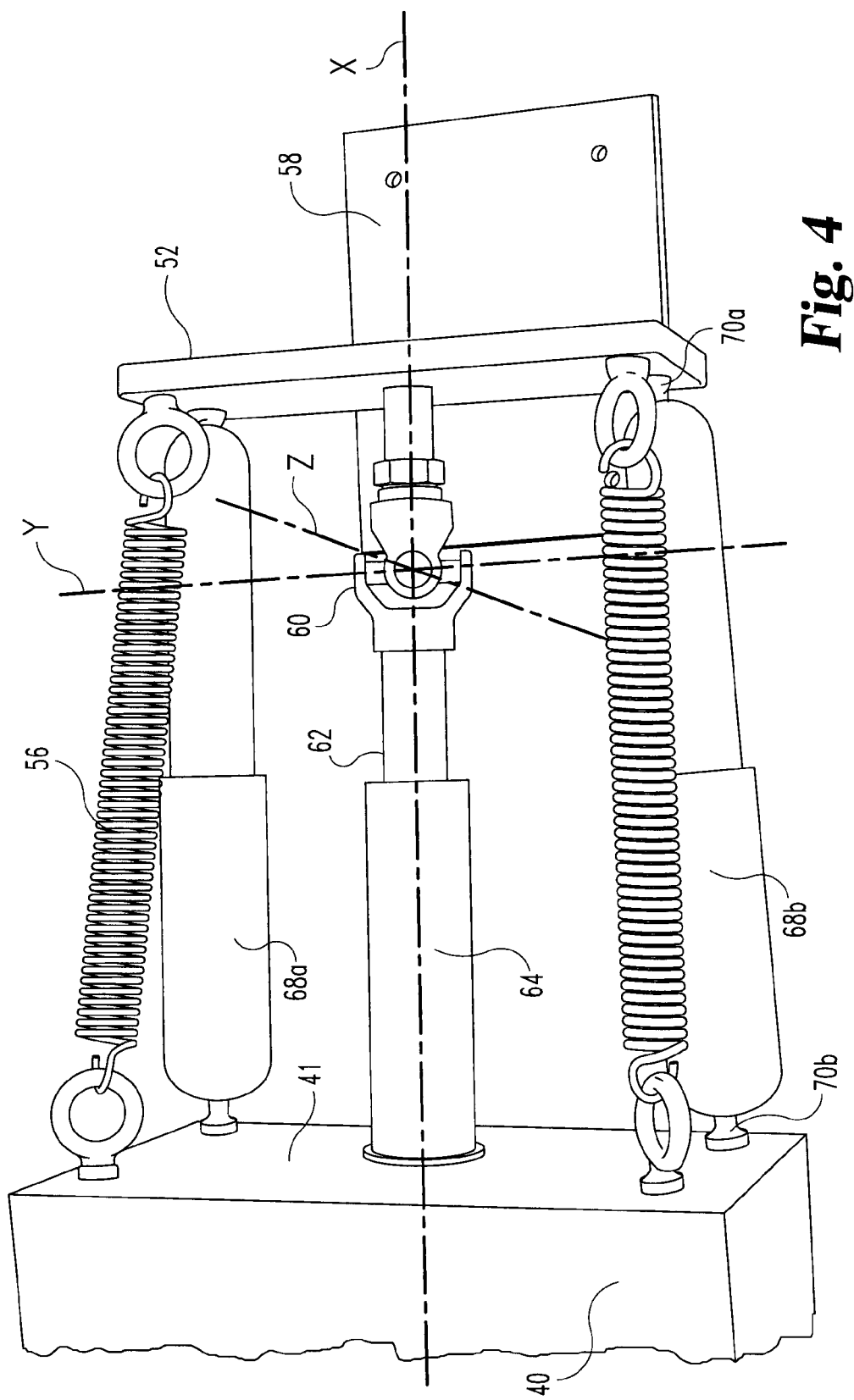
FIG. 4 is a top, enlarged perspective view of a portion of an apparatus according to an alternate embodiment of the present invention.

FIG. 4 depicts an alternate embodiment of the present invention. In this embodiment, ball joint 54 is replaced by a universal coupling 60 which permits two degrees of rotational freedom (around the Y and Z axes). Further, shaft 62, which is rigidly attached to U-joint 60, is rotatingly received within the bore of a housing 64. Shaft 62 and U-joint 60 are thereby free to rotate about the X axis, thereby providing three degrees of rotational freedom. In some embodiments, sleeve 62 and U-joint 60 are further permitted to translate in and out of the bore of housing 64, thus providing a fourth degree of translational freedom along the X axis.

The embodiment shown in FIG. 4 further includes one or more dampeners or shock absorbers 68a and 68b which provide dampening of the motion of the user platform relative to the propulsion section. Referring to shock absorber 68b, at its front end it is connected to plate 52 by a joint 70a which permits at least one degree of rotational freedom, and preferably multiple degrees of rotational freedom and/or sliding. Interconnection 70b between shock absorber 68b and the front face 41 of propulsion section 40 is preferably similarly constructed to front joint 70a. Other shock absorbers are similarly interconnected to the platform and the propulsion section. Although what has been shown and described is the use of two shock absorbers laterally spaced apart, the present invention also contemplates those embodiments containing fewer or more shock absorbers, and also in which there is a vertical displacement between shock absorbers. Further, the present invention contemplates the use of shock absorbers which provide only a dampening function, as well as shock absorbers which include a spring or biasing unit.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An apparatus comprising:
   a snowboard having a front and a rear and adapted and configured for accepting a standing operator;
   a propulsion unit being adapted and configured for propelling said propulsion unit and said snowboard over snow, said propulsion unit having a front and a rear;
   a ball joint interconnecting the front of said propulsion unit to the rear of said snowboard, said ball joint permitting said snowboard to rotate about said propulsion unit with at least two degrees of rotational freedom; and
   a spring interconnecting said propulsion unit to said snowboard;
   wherein said spring is a first spring adapted and configured to apply a biasing force along a first axis, the apparatus further comprising a second spring interconnecting the front of said propulsion unit to the rear of said snowboard and adapted and configured to apply a biasing force along a second axis, and a third spring interconnecting the front of said propulsion unit to the rear of said snowboard and adapted and configured to apply a biasing force along a third axis, wherein the first axis is horizontally displaced from the third axis, and the second axis is vertically displaced from the third axis.

2. The apparatus of claim 1 wherein said spring interconnects the front of said propulsion unit to the rear of said snowboard, said spring being adapted and configured to apply a biasing force along a first axis, said ball joint being rotational about a longitudinal axis, and the first axis is displaced from the longitudinal axis.

3. The apparatus of claim 1 wherein said ball joint permits said snowboard to rotate about said propulsion unit with at least three degrees of rotational freedom.

4. The apparatus of claim 1 wherein said spring is a coil spring.

5. The apparatus of claim 1 wherein said spring has a length and a pair of opposing ends along the length, one end being interconnected to said platform by a first sliding joint and the other end being interconnected to said propulsion unit by a second sliding joint.

6. The apparatus of claim 1 which further comprises a forward hand grip and an aft hand grip, said forward hand grip connected to said front of the snowboard and said aft hand grip connected to said rear of the snowboard.

7. The apparatus of claim 1 which further comprises a forward control panel and an aft control panel, said forward control panel connected to said front of the snowboard and said aft control panel connected to said rear of the snowboard.

8. The apparatus of claim 1 which further comprises a member adjustable in length and connecting said ball joint to one of propulsion unit or said snowboard, said member being fixable at a particular length to establish the distance between said snowboard and said propulsion unit.

9. An apparatus comprising:
   a user platform having a front and a rear;
   a propulsion unit and being adapted and configured for propelling said propulsion unit and said platform, said propulsion unit having a front and a rear, the front of said propulsion unit being behind the rear of said platform;
   a first spring interconnecting said propulsion unit to said platform and adapted and configured to apply a biasing force along a first axis, a second spring interconnecting said propulsion unit to said platform and adapted and configured to apply a biasing force along a second axis, a third spring interconnecting said propulsion unit to said platform and adapted and configured to apply a biasing force along a third axis, wherein the first axis, second axis, and third axis are not coplanar; and
   a pivotal member connecting the rear of the user platform to the front of the propulsion unit wherein said pivotal member separates the user platform and the propulsion unit by a predetermined distance.

10. The apparatus of claim 9 wherein said pivotal member includes a ball joint interconnecting the front of said propulsion unit to the rear of said platform.

11. The apparatus of claim 9 wherein said first spring interconnects the front of said propulsion unit to the rear of said platform, said second spring interconnects the front of said propulsion unit to the rear of said platform, and said third spring interconnects the front of said propulsion unit to the rear of said platform.

12. The apparatus of claim 9 wherein said pivotal member permits rotation of said platform relative to said propulsion unit about two orthogonal axes.

13. The apparatus of claim 9 wherein said pivotal member permits rotation of said platform relative to said propulsion unit about three orthogonal axes.

14. The apparatus of claim 9 which further comprises a dampener between the rear of said platform and the front of said propulsion unit, said dampener interconnecting the rear of said platform to the front of said propulsion unit.

15. The apparatus of claim 9 wherein the user platform is a snowboard and the propulsion unit is adapted and configured for propelling the user platform over snow.

16. The apparatus of claim 9 wherein the user platform is a skateboard and the propulsion unit is adapted and configured for propelling the user platform over a roadway.

17. The apparatus of claim 9 wherein said pivotal member includes a U-joint interconnecting the front of said propulsion unit to the rear of said platform.

18. An apparatus comprising:
a snow-traversing platform having a front and a rear and adapted and configured for accepting a standing operator;
a propulsion unit being adapted and configured for propelling said propulsion unit and said platform over snow, said propulsion unit having a front and a rear;
a pivotal joint interconnecting the front of said propulsion unit to the rear of said platform, said pivotal joint permitting said platform to rotate about said propulsion unit with at least two degrees of rotational freedom;
a first spring interconnecting said propulsion unit to said platform and adapted and configured to apply a biasing force between said propulsion unit and said platform and a second spring interconnecting said propulsion unit to said platform and adapted and configured to apply a biasing force between said propulsion unit and said platform, wherein said first spring is connected to said propulsion unit above said pivotal joint and to one side of said pivotal joint, and said second spring is connected to said propulsion unit below said pivotal joint and to the other side of said pivotal joint.

19. The apparatus of claim 18 wherein said pivotal joint permits said platform to rotate about said propulsion unit with at least three degrees of rotational freedom.

20. The apparatus of claim 19 wherein said pivotal joint includes a ball and socket.

21. The apparatus of claim 19 wherein said pivotal joint includes a U-joint.

22. The apparatus of claim 19 which further comprises a third spring adapted and configured to apply a biasing force between said propulsion unit and said platform, said third spring being spaced apart horizontally from one of said first spring or said second spring, said third spring being spaced apart vertically from the other of said first spring or said second spring.

23. The apparatus of claim 19 which further comprises a member adjustable in length and connecting said pivotal joint to one of propulsion unit or said platform, said member being fixable at a particular length to establish the distance between said platform and said propulsion unit.

24. The apparatus of claim 18 which further comprises a member adjustable in length and connecting said pivotal joint to one of propulsion unit or said platform, said member being fixable at a particular length to establish the distance between said platform and said propulsion unit.

25. The apparatus of claim 18 wherein each of said first spring and said second spring have a length and a pair of opposing ends along the length with at least one end of each said first spring and said second spring being interconnected to said platform or said propulsion unit by a sliding joint.

26. An apparatus comprising:
a platform having a front and a rear and adapted and configured for accepting a standing operator;
a propulsion unit being adapted and configured for propelling said propulsion unit and said platform over snow, said propulsion unit having a front and a rear;
a pivotal joint interconnecting the front of said propulsion unit to the rear of said platform, said pivotal joint permitting said platform to rotate about said propulsion unit with at least two degrees of rotational freedom; and
a spring interconnecting said propulsion unit to said platform, wherein said spring has a length and a pair of opposing ends along the length, one end being interconnected to one of said platform or said propulsion unit by a first sliding joint, said spring and said first sliding joint being adapted and configured to permit yawing of said platform relative to said propulsion unit.

27. The apparatus of claim 26 wherein the other end of said spring is interconnected to said platform by a second sliding joint, said spring and said second sliding joint being adapted and configured to permit yawing of said platform relative to said propulsion unit.

28. The apparatus of claim 27 wherein said pivotal joint permits said platform to rotate about said propulsion unit with three degrees of rotational freedom.

29. The apparatus of claim 26 wherein said spring is a first spring, and which further comprises second and third springs interconnecting said propulsion unit to said platform, wherein each said second and third springs have a length and a pair of opposing ends along the length, one end of each said second and third spring being interconnected to one of said platform or said propulsion unit by respective second and third sliding joints, said second and third springs and said second and third sliding joints being adapted and configured to permit yawing of said platform relative to said propulsion unit.

30. The apparatus of claim 29 wherein said first spring is horizontally spaced apart from said second and third springs, and said third spring is vertically spaced apart from said first and second springs.

* * * * *

UNITED STATES PATENT AND TRADEMARK OFFICE
CERTIFICATE OF CORRECTION

PATENT NO. : 6,698,540 B1
DATED : March 2, 2004
INVENTOR(S) : Decker, Jr.

It is certified that error appears in the above-identified patent and that said Letters Patent is hereby corrected as shown below:

Column 8,
Line 1, claim 23 should depend upon claim 22. Please remove "claim 19" and replace with -- claim 22 --.

Signed and Sealed this

Twenty-first Day of June, 2005

JON W. DUDAS
*Director of the United States Patent and Trademark Office*